Nov. 11, 1930.  S. MACK  1,781,184
SIGNAL FOR AUTOMOBILES
Original Filed May 28, 1928  2 Sheets-Sheet 2
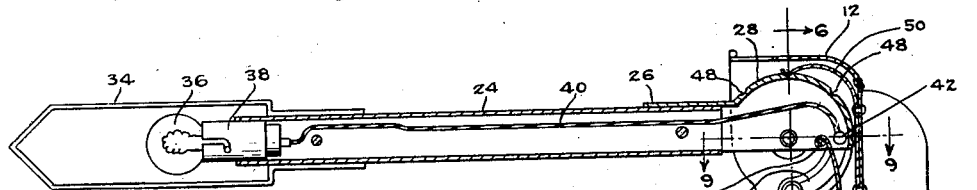
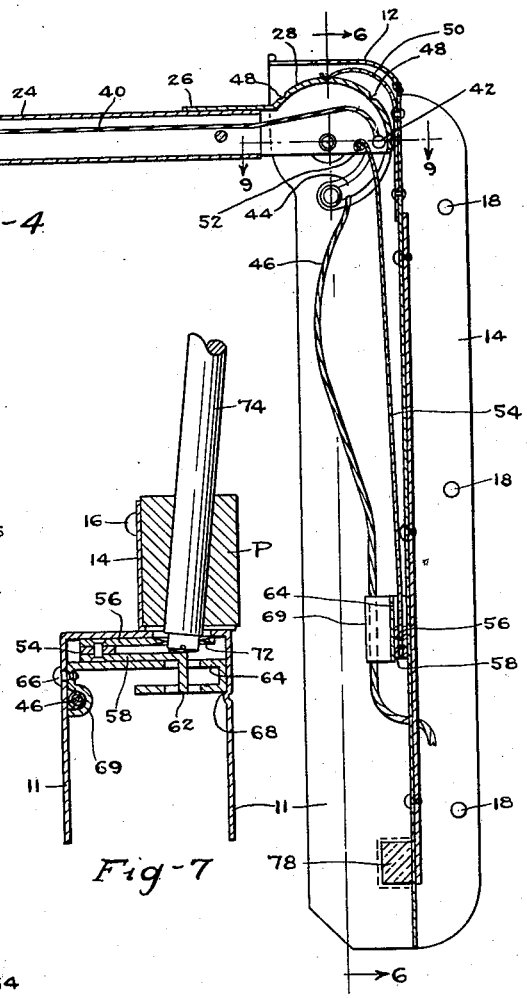
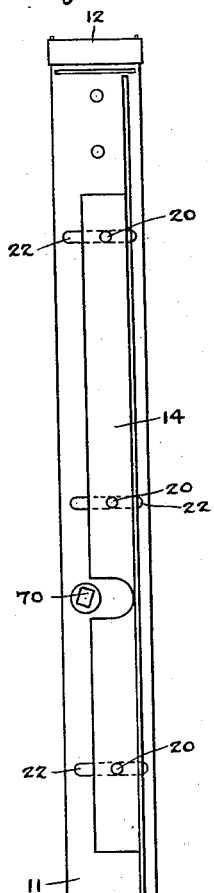
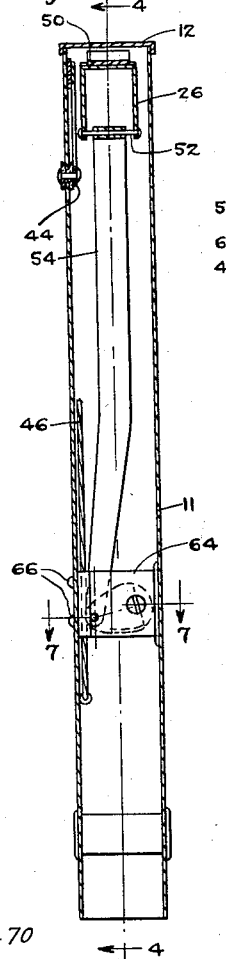
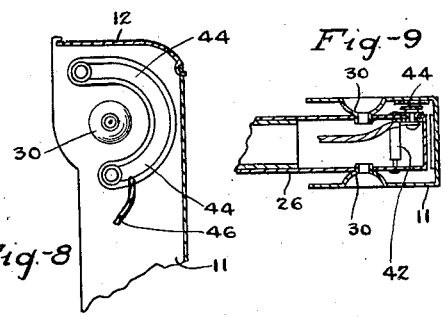
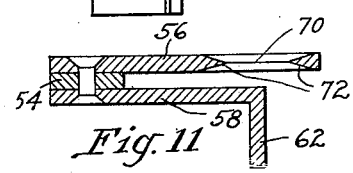
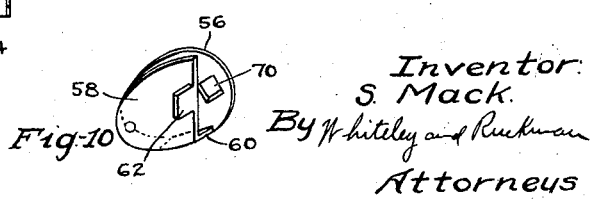
Inventor:
S. Mack.
By Whitley and Ruckman
Attorneys Patented Nov. 11, 1930

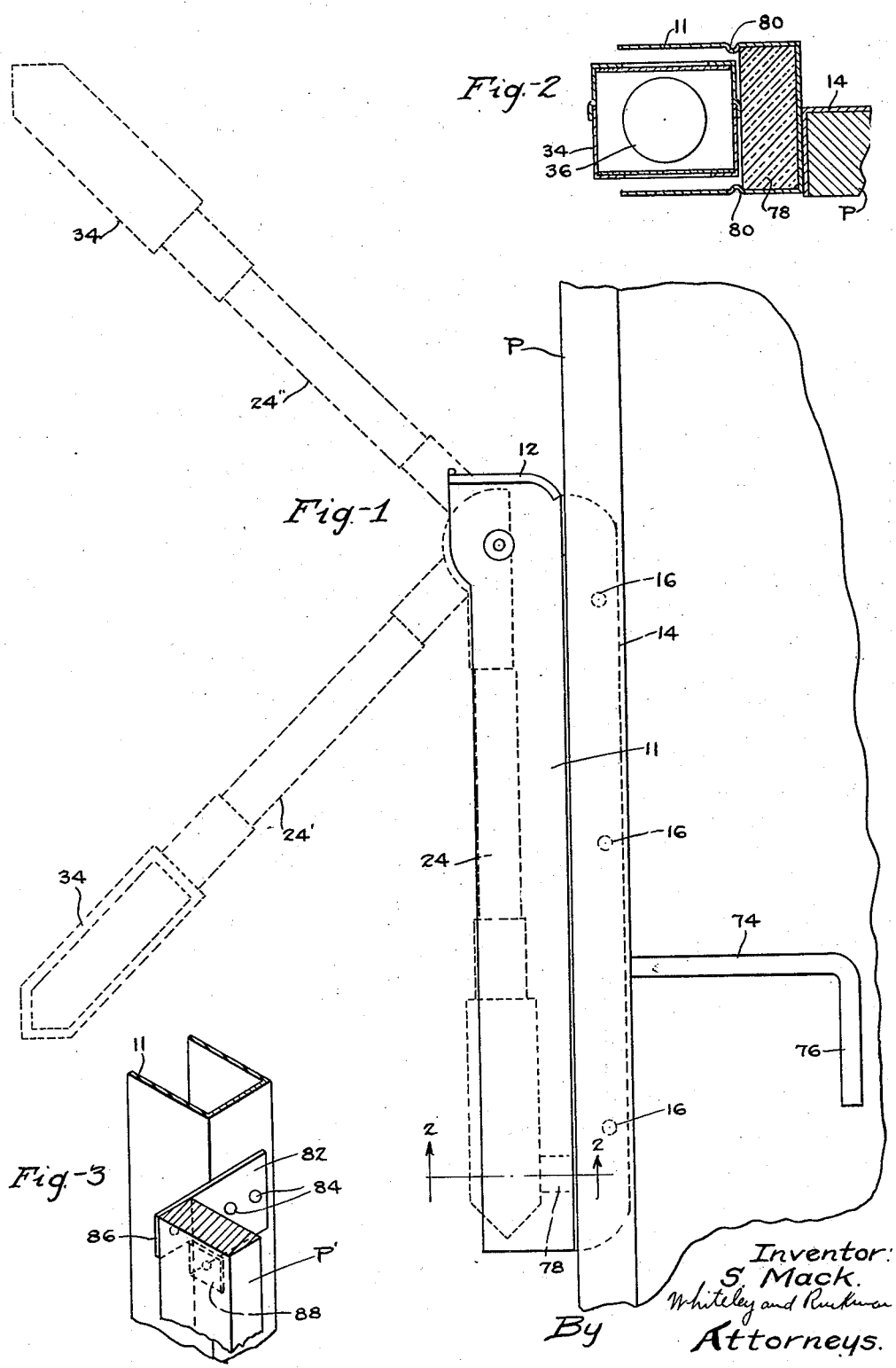

1,781,184

UNITED STATES PATENT OFFICE

SEBASTIAN MACK, OF MINNEAPOLIS, MINNESOTA

SIGNAL FOR AUTOMOBILES

Application filed May 28, 1928, Serial No. 281,127. Renewed April 18, 1930.

My invention relates to signals for automobiles, and more particularly to signals for use with closed automobiles. An object is to provide a device of this character which may be readily operated by the driver from his seat without the necessity of extending one of his arms from the side of the vehicle, or opening one of the doors thereof to indicate the manner in which he is going to drive the automobile such as in regard to turning and stopping. Another object is to provide a device of this character which can be readily installed in automobiles of various makes. Another object is to provide a device of this character which is simple in construction and economical to manufacture and yet extremely efficient for the purpose intended. Another object is to provide a device of this character which may be readily and securely attached to narrow corner posts of automobiles. A particular object of my invention is to improve upon the construction disclosed in my prior Patent No. 1,663,715 issued March 27, 1928, in regard to economy of construction, ease of installation, and facility of accommodating the device to automobiles regardless of inclination and size of the front corner post. I accomplish the objects of my invention by providing a support adapted to be secured to a corner post of the automobile, a signal arm pivoted at one end to said support, a link attached at one end to said arm adjacent the pivoted end of the latter, a crank arm consisting of two spaced members secured to each other with the free end of said link passing between said members and pivoted to one end thereof, one of said spaced members having a lug extending out therefrom, a member secured to said support and having an opening for receiving said lug as a fulcrum, and an operating rod whose outer end is attached to the crank arm for turning the latter. In order that the device may be readily installed, the crank arm is provided with an angular opening in which the suitably shaped outer end of the operating rod fits. In order that the device may be readily operated regardless of inclination of the corner post, the angular opening is preferably provided with a margin constituted by knife edges. In order that the device may be readily attached to narrow corner posts, I provide a strip having one of its end portions split horizontally, a vertical support attached to the unsplit end portion of said strip, one of the members of the split portion of the strip being bent back at right angles for securing it to the forward face of a corner post of an automobile and the other end portion of the split portion being adapted to be secured to the outer face of said corner post, and a signal arm pivoted to said support.

The full objects and advantages of my invention will appear in connection with the detailed description thereof, and the novel features of my inventive idea will be particularly pointed out in the claims.

In the accompanying drawings which illustrate a practical embodiment of my invention, Fig. 1 is a rear elevational view of the device showing it attached to a post of an automobile. Fig. 2 is a view in horizontal section on the line 2—2 of Fig. 1. Fig. 3 is a fragmentary view in perspective showing a slight modification. Fig. 4 is a view in vertical section on the line 4—4 of Fig. 6. Fig. 5 is an elevational view of the inner side of the device. Fig. 6 is a view in vertical section on the line 6—6 of Fig. 4. Fig. 7 is a view in section on the line 7—7 of Fig. 6. Fig. 8 is a fragmentary view corresponding to the upper right hand portion of Fig. 7 with an operating connection removed. Fig. 9 is a view in section on the line 9—9 of Fig. 4. Fig. 10 is a detail view in perspective of a crank arm device. Fig. 11 is a sectional view of this device on an enlarged scale.

Referring to the drawings, the numeral 11 designates an open-sided or U-shaped casing which is closed at the top by a curved detachable member 12 which may be snapped in place in well known manner. The casing 11 together with an angle strip 14 constitutes a support for a signal arm. The strip 14 is secured to a front corner post P of an automobile by screws 16 passing through holes 18 in one of the angle members of the strip. The other angle member of this strip is provided with holes for receiving the screws 20 which pass through transverse slots 22 formed in the inner wall of the casing 11. It will be understood that the provision of the slots 22 enables the casing 11 to be secured in a vertical position regardless of whether or not the post P occupies the vertical position or a somewhat inclined position. The signaling portion of the device includes an arm which consists of a tubular member 24 which at its inner end is secured to a base member 26 having an open bottom and an upper rounded wall 28. The two opposite walls of the base member 26 are provided with holes which receive trunnions 30 struck inwardly from the adjacent walls of the casing 11. A hollow head member 34 is secured to the outer end of the tubular member 24 and this head member has slots or windows in its front and rear sides through which light from an electric bulb 36 passes. This bulb is held in a socket 38 carried by the outer end of the tubular member 24. An insulated wire 40 extends from the socket member 38 to a contact member 42 insulatively mounted on the base member 28. The contact member 42 is disposed for sliding engagement with a segmental contact strip 44 insulatively mounted on the inside of the casing 11. The battery of the automobile is connected by an insulated wire 46 with the contact strip 44. The contact member 42 moves off the upper end of the segmental strip 44 when the signaling arm is in its folded position so that the light will be off. When the arm is moved upwardly, the two contacts are brought into engagement with each other so that the bulb 36 is lighted by current from the battery. In order to releasably hold the signal arm in different outward positions for giving the desired signal, the outside of the rounded wall 28 is provided with notches 48 adapted to receive the curved end of a leaf spring 50 which at its other end is secured to the casing 11. The base member 26 opposite the rounded wall 28 carries a pin 52 to which the upper end of a link 54 is pivotally attached. The lower end of the link 54 is pivotally attached to a crank arm which consists of two spaced members 56 and 58, these two members being connected to each other at the bottom as indicated at 60 in Fig. 10, and the link passing between the two members near one end thereof. The member 58 is provided with a lug 62 which extends out at right angles, this lug being adapted to turn in openings formed in the branches of a U-shaped member 64 held in the casing 11 at one side by screws 66 and at the other end by a lug 68 struck inwardly from the casing. The member 64 has a curved end portion 69 which serves to hold the wire 46 in place. The member 56 of the crank arm is provided with an angular shaped hole 70 shown in the drawings as square and whose edges are formed as knife edges 72 best shown in Fig. 11. A rod 74 passes rotatably through a hole in the post P. The outer end of the rod 74 is reduced and is formed of such shape as to fit into the angular shaped hole 70. A handle member 76 is carried by the inner end of the rod 74 so that the driver may readily operate the signal, it being noted that the lug 62 constitutes a fulcrum for the turning of the crank arm. A buffer 78 which may consist of a block of rubber is placed in the lower end of the casing 11, being held therein by lugs 80 struck inwardly from the casing 11 as shown in Fig. 2. A slight modification is shown in Fig. 3 having for its purpose the attachment of the casing 11 to a narrow post indicated at P'. A strip 82 is secured to the casing by rivets or screws 84. This strip has an end portion extending beyond the casing which end portion is split horizontally to form two members 86 and 88, the member 88 being bent back at right angles. The member 86 is secured to the outer side of the post while the member 88 is secured to the forward side of the post. It will be understood that two strips 82 may be employed, one of them being secured to the casing 11 near its upper end and another one being secured near the lower end of the casing so that the latter can be attached firmly to posts which are extremely narrow.

The operation and advantages of my invention have to a large extent been indicated. The signal arm is normally housed in the casing 11 in depending position as shown at 24 in Fig. 1. When the driver wishes to signal, he turns the handle 76 thereby bringing the signal arm into either downwardly inclined or upwardly inclined positions as indicated at 24' and 24'' in Fig. 1 or into outwardly directed position as shown in Fig. 4. The arm is temporarily held in the desired position by the engagement of the spring 50 in one of the notches 48. An important advantage of my invention consists in the fact that when not in use for signaling, the signal arm is housed in the casing 11 with no outstanding portion to confuse persons who are relying upon the signal as an indication of the manner in which the driver intends to drive the automobile. Another advantage consists in the fact that the device may be readily attached to a post of any make of automobile regardless of the size or inclination of the post. With regard to the inclination which it is desirable to give the operating rod 74, its inner reduced end may be engaged in the hole 70 on account of the knife edges with which the hole is provided and which provides a thin line of engagement with the reduced end.

I claim:

1. A signal for automobiles comprising a support adapted to be secured to a corner post of the automobile, a signal arm pivoted at one end to said support, a link attached at one end to said arm adjacent the pivoted end of the latter, a crank arm attached to the other end of said link, said crank arm having an angular opening whose margin is constituted by knife edges, and an operating rod whose outer end is shaped to fit said angular opening in engagement with said knife edges.

2. A signal for automobiles comprising a support adapted to be secured to a corner post of the automobile, a signal arm pivoted at one end to said support, a link attached at one end to said arm adjacent the pivoted end of the latter, a crank arm consisting of two spaced members secured to each other, the other end of said link passing between said members and being pivoted to one end thereof, one of said members having a lug extending out therefrom, a member secured to said support and having an opening for receiving said lug as a fulcrum, and an operating rod whose outer end is attached directly to said crank arm for turning the latter.

3. A signal for automobiles comprising a strip having one of its end portions split horizontally, a vertical support attached to the unsplit end portion of said strip, one of the members of the split portion of said strip being bent back at right angles for securing it to the forward face of a corner post of an automobile and the other member of said split portion being adapted to be secured to the outer face of said corner post, a signal arm pivoted to said support and adapted to lie adjacent and parallel to the latter, and connections extending from said arm to the inside of the automobile whereby said arm may be swung into outwardly extending position.

In testimony whereof I hereunto affix my signature.

SEBASTIAN MACK.